US008666392B2

(12) United States Patent
Pauly

(10) Patent No.: US 8,666,392 B2
(45) Date of Patent: Mar. 4, 2014

(54) METHOD FOR TESTING APPLIANCES FOR A MOBILE-RADIO SYSTEM, SIGNAL GENERATOR, APPLIANCE FOR A MOBILE-RADIO SYSTEM, AND A MEASUREMENT SYSTEM

(75) Inventor: Andreas Pauly, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 491 days.

(21) Appl. No.: 12/673,733

(22) PCT Filed: Jun. 17, 2008

(86) PCT No.: PCT/EP2008/004869

§ 371 (c)(1),
(2), (4) Date: Feb. 16, 2010

(87) PCT Pub. No.: WO2009/021575

PCT Pub. Date: Feb. 19, 2009

(65) Prior Publication Data

US 2011/0250847 A1 Oct. 13, 2011

(30) Foreign Application Priority Data

Aug. 14, 2007 (DE) .......................... 10 2007 038 337

(51) Int. Cl.
*H04W 24/00* (2009.01)

(52) U.S. Cl.
USPC .................... 455/425; 455/67.11; 455/67.14; 455/423; 455/424

(58) Field of Classification Search
None
See application file for complete search history.

(56) References Cited

U.S. PATENT DOCUMENTS

| 4,326,262 A | 4/1982 | Clement |
| 6,697,604 B1* | 2/2004 | Rimpela et al. ............. 455/67.14 |
| 7,729,417 B2* | 6/2010 | Van Den Brink et al. ..... 375/224 |
| 2003/0069010 A1* | 4/2003 | Eravelli ........................ 455/423 |

(Continued)

FOREIGN PATENT DOCUMENTS

| DE | 101 24 371 A1 | 11/2002 |
| EP | 0 817 515 A1 | 1/1998 |

(Continued)

OTHER PUBLICATIONS

International Preliminary Report on Patentability, PCT/EP2008/004869, May 3, 2010, pp. 1-10.
International Search Report, WO 2009/021575 A1, Nov. 14, 2008, pp. 33-38.

*Primary Examiner* — Nay A Maung
*Assistant Examiner* — Alejandro Rivero
(74) *Attorney, Agent, or Firm* — Ditthavong Mori & Steiner, P.C.

(57) ABSTRACT

A method, a signal generator, an appliance for a mobile radio system, and a measurement system are provided. First of all, a signal generator generates signal data. The signal data are used to generate a signal which is sent to the appliance which is to be tested. The appliance which is to be tested receives the signal and evaluates it. The evaluation of the received signal is taken as a basis for generating a response signal, wherein the response signal has an envelope which is characteristic of the information which is to be returned. This characteristic envelope is measured and a measurement signal which is representative thereof is generated. The measurement signal is supplied to a correlator in the signal generator and is compared with a comparison signal stored in the signal generator.

16 Claims, 4 Drawing Sheets

(56) References Cited

U.S. PATENT DOCUMENTS

| | | |
|---|---|---|
| 2005/0070268 A1* | 3/2005 | Hakkinen et al. ............ 455/423 |
| 2006/0094416 A1 | 5/2006 | Endo et al. |
| 2006/0154610 A1* | 7/2006 | Rumney .................... 455/67.14 |
| 2006/0194553 A1 | 8/2006 | Ozaki et al. |
| 2006/0205398 A1* | 9/2006 | Seckendorf et al. .......... 455/423 |
| 2010/0120416 A1* | 5/2010 | Huber et al. ................. 455/425 |
| 2010/0190451 A1* | 7/2010 | Huber et al. ............... 455/67.14 |

FOREIGN PATENT DOCUMENTS

| | | | |
|---|---|---|---|
| EP | 0905940 A2 * | 3/1999 | ............... H04L 1/24 |
| EP | 1 414 179 A1 | 4/2004 | |
| GB | 2 352 129 A | 1/2001 | |
| WO | WO 01/26259 A1 | 4/2001 | |
| WO | WO 2004/107653 A1 | 12/2004 | |
| WO | WO 2005/074173 A1 | 8/2005 | |

* cited by examiner

METHOD FOR TESTING APPLIANCES FOR A MOBILE-RADIO SYSTEM, SIGNAL GENERATOR, APPLIANCE FOR A MOBILE-RADIO SYSTEM, AND A MEASUREMENT SYSTEM

CROSS-REFERENCE TO RELATED APPLICATION

The present application is a national phase application of PCT Application No. PCT/EP2008/004869, filed on Jun. 17, 2008, and claims priority to German Application No. DE 10 2007 038 337.3, filed on Aug. 14, 2007, the entire contents of which are herein incorporated by reference.

BACKGROUND OF THE INVENTION

1. Field of the Invention

The invention relates to a method for testing devices of mobile-radio systems, devices provided for this purpose, a signal generator and a measuring system.

2. Discussion of the Background

For the testing of mobile radio systems, a so-called protocol tester is conventionally used. This protocol tester communicates via a standardized radio connection with a device of the mobile-radio system, that is to say, a base station or a mobile-radio device. For the test, a standardized connection of this kind is established with so-called uplink and downlink signals between the device under test and the protocol tester. During an early developmental stage, analysis of a device under test by means of a protocol tester is often not yet possible, because all of the functions prescribed in the respective mobile-radio standard have not yet been implemented. Moreover, the protocol testers are qualitatively inferior to a signal generator with regard to the quality of a transmitted high-frequency signal. Accordingly, in the development of devices for mobile-radio systems, it is often desirable to test the behavior of the device under test by means of a signal generator. These tests include test cycles, which are adapted, for example, to a test loop to be implemented subsequently in the production stage.

A signal generator, with which a high-frequency signal corresponding to a selected mobile-radio standard can be generated and transmitted, is known, for example, from DE 101 24 371. The signal generator can generate a standardized high-frequency signal and transmit it over a radio path to a device under test, however, no return channel is set up between the signal generator and the device under test. This signal generator provides a signal-generating portion, a transmission portion and a control portion. A signal, which is generated within the signal-generating portion, is transmitted by means of the transmission portion. The generation of the signal including the signal data, upon which the signal to be generated and transmitted is based, is controlled in this context by a control portion of the signal generator.

Accordingly, it is, on one hand, possible to generate a high-quality transmission signal, but, on the other hand, the use of a signal generator has the disadvantage that a corresponding reception device for processing the response signal transmitted from the device under test via a return channel, also in conformity with a mobile-radio standard, is not provided.

SUMMARY OF THE INVENTION

The invention advantageously provides a measuring system, a corresponding signal generator, a device for a mobile radio system and a method for testing a device for a mobile-radio system, wherein a measurement of properties of the device of the mobile-radio system can be implemented, without the signal generator used for the measurement requiring a reception device for the standardized processing of the response signal returned from the device under test in the uplink or respectively downlink.

According to the invention, a signal generator is used for testing devices of a mobile-radio system. The signal generator provides a signal-generating portion for generating a signal corresponding to a mobile-radio standard from the signal data, upon which the signal is based. Furthermore, the signal generator provides a transmission portion for transmitting the generated signal and a control portion for controlling the signal-generating portion and/or the transmission portion. Moreover, the signal generator provides a correlator, wherein a comparison signal and a measuring signal can be supplied to the correlator for comparison.

The device for a mobile-radio system provides a transmission and reception module. An evaluation unit is connected to the transmission module and the reception module. According to the invention, the evaluation unit comprises a response-signal-generating portion, which is set up in such a manner that the response signal transmitted from the device provides a characteristic envelope for the communication of information.

Signal data are initially generated for the implementation of the method according to the invention. From these signal data, a signal to be transmitted is generated by the signal generator and transmitted to the device under test. This signal is received by the device under test and evaluated by its evaluation unit. On the basis of the evaluated signal, a response signal is generated. The response signal contains information, which, for example, returns the correct reception and evaluation of the signal or a requested power setting. The response signal provides an envelope characteristic for the information to be returned. This characteristic envelope is sampled, and a test signal representing the envelope is generated. Within the signal generator, the test signal is compared with at least one comparison signal.

A measurement of this kind of a characteristic envelope of the response signal accordingly allows the processing by the signal generator of a measurable value such as the envelope of the response signal or respectively the test signal obtained from it. A standardized evaluation of the response signal is therefore not required. A reception portion for the reception and demodulation of the response signal returned via a return channel is therefore not required by the signal generator.

Accordingly, for example, the correct reception of a data packet by the device under test can be determined and in consequence, a positive acknowledgement signal regarding the correct reception of the information can be transmitted by the device as a response signal. By contrast, if the information is not correctly transmitted and evaluated, a negative acknowledgement signal is communicated as a response signal. Instead of the evaluation of these returned acknowledgement signals, only the envelope of the response signal characteristic for a positive or negative acknowledgement signal is now measured. The possible characteristic waveforms of the envelopes of the response signal are therefore limited. They are buffered in the signal generator in each case in the form of a comparison signal. In consequence, the measurement of the envelope of the response signal is sufficient to determine the information contained in the response signal through a comparison with the buffered comparison signals. Accordingly, different functions of a device under test, for example, a base station or a mobile-radio device, can be tested by a signal generator, which provides a high-quality signal. The signal generator used need only provide a transmission portion and a possibility for sampling the envelope of the response signal.

The method according to the invention is particularly simple to implement, if the standard, for which the device under test is to be tested anyway provides a characteristic envelope. Such standards include, for example, 3GPP HSPA ($3^{rd}$ Generation Partnership Project High Speed Packet Access), WiMAX® (Worldwide Interoperability for Microwave Access) or EUTRA/LTE (Evolved-UMTS-Terrestrial-Radio-Access/Long Term Evolution).

By preference, a change command is assigned to every comparison signal. In the event of an agreement of the test signal with a comparison signal, for signals to be transmitted subsequently within a test cycle, the generation and/or the transmission of the signal is implemented taking into consideration the change command. A change of the signal to be transmitted can be implemented by the signal generator through these change commands. Accordingly, it can be determined how the signal to be transmitted subsequently within the test cycle and/or its transmission parameters should be changed by measuring the envelope of the response signal and subsequently comparing the test signal obtained from this with the comparison signals. A test cycle contains a plurality of signals transmitted in succession, wherein the evaluation on the basis of the evaluated signals allows a measurement, for example, of error rates of the device under test. Transmission parameters to be changed can be, for example, the power of the signal to be transmitted by the signal generator. Conversely, it is also possible to transmit a redundant version of the previously transmitted signal to the device for a mobile-radio system. This occurs, for example, in the case of an erroneous evaluation of the previously transmitted signal by the device under test and the return of a negative acknowledgement signal corresponding to the latter. Accordingly, the signal generator then transmits a signal to the device under test, which satisfies a specification (for example, by indicating a redundancy version to be transmitted). However, the signal generator does not require a reception module which allows a standardized processing of the returned response signal.

A buffer is provided within the signal generator, in which comparison signals and change commands assigned to the comparison signals are buffered. A control portion of the signal generator is set up in such a manner that, in the event of an agreement of the test signal with one of the comparison signals, the signal-generating portion and/or the transmission portion is accordingly controlled by the control portion according to the change command.

In particular, it is preferable if a response signal corresponding to a comparison signal is generated by the device under test as a pattern. On the basis of a targeted measurement of this response signal, a test signal is generated, which is buffered as a comparison signal in the buffer of the signal generator. Accordingly, not all comparison signals must be buffered a priori in the signal generator. On the contrary, for example, in the case of an initialization of a test cycle, every response signal possible within the test can first be generated by the device under test and accordingly a pattern can be transmitted. The test signals generated on the basis of these measured response signals are then buffered in the signal generator in each case as comparison signals. In this manner, the signal generator "learns" at the start of a test procedure to recognize the comparison signals by measuring the characteristic envelopes of the real response signals transmitted by the device under test. During the implementation of a further measurement of the test cycle, a test signal representing the response signal is checked in each case for agreement with the previously buffered comparison signals. In this context, the checking for agreement is implemented by comparing the comparison signals with the test signal generated from the respective response signal in the form of a pattern recognition in a correlator.

For the measurement of the envelope, for example, a test probe can be connected to the signal generator. In order to allow a correctly timed assignment of the test signal and therefore ultimately of the response signal to a previously transmitted signal, the test probe, which is connected to the signal generator to measure the characteristic envelope, is preferably read out in a time controlled manner. The read-out of the input connection time-coordinated with reference to the transmitted signal and accordingly of the read-in of the supplied test signal is therefore implemented by the control portion.

By preference, a signal initiating the test cycle is transmitted to the device under test at the start of the test cycle by the signal generator. For this purpose, it is preferable if, alongside the signals determined for the implementation of the actual measurement, the signal generator can generate at least one second signal differing from the former. Within the device under test, there is a signal interpreter, which recognizes this signal differing from the other signals and accordingly detects the start of the test cycle.

The device under test is preferably set up in such a manner that a response signal with a characteristic envelope is generated, even if the signal transmitted by the signal generator is associated with a mobile-radio standard, which provides a constant envelope for the response signal. For this purpose, the device for the mobile-radio system, which is tested in the measurement system according to the invention, provides a response-generating portion within an evaluation unit, which is set up in such a manner that, in a first mode, the response signal returned from the device provides a constant envelope or, in a second mode, an envelope changing in a characteristic manner for the communication of information. Accordingly, if a response signal with a constant envelope is generated in a standardized manner by the device for a mobile-radio system, the response-signal-generating portion of the device according to the invention is capable of generating an envelope of the response signal changing in a characteristic manner as an alternative. Accordingly, the response-signal-generating portion is set up in such a manner that it can generate a response signal differing from the actually underlying mobile-radio standard.

In this context, it is particularly preferred that the evaluation unit provides a signal interpreter, with which a corresponding switchover instruction can be recognized. Using such a switchover instruction or respectively a signal at the start of a test cycle then allows the response-signal-generating portion to switch from its regular mode, in which a response signal is generated in a standardized manner, into a test mode, in which the envelope provides a waveform characteristic for the information to be transmitted.

BRIEF DESCRIPTION OF THE DRAWINGS

The invention is explained in greater detail in the drawings with reference to a preferred exemplary embodiment. The drawings are as follows.

DETAILED DESCRIPTION OF EXEMPLARY EMBODIMENTS OF THE INVENTION

Figure 1:
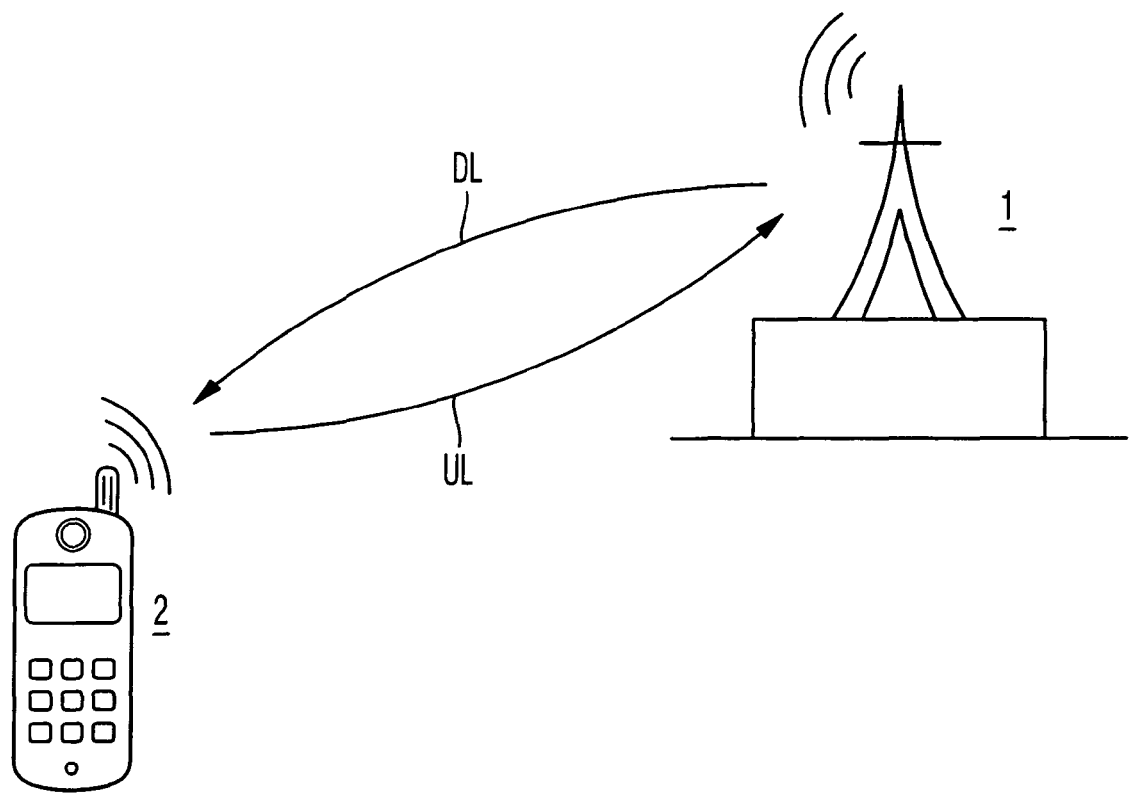
FIG. 1 shows a schematic presentation of the communication within a mobile-radio system.

In FIG. 1, a connection between a base station and a mobile-radio device 2 is presented in a schematic and extremely simplified manner. The radio connection between the antenna of the base station 1 and the antenna of the mobile-radio device 2 provides a first transmission direction ("downlink") from the base station 1 to the mobile-radio device 2 and a second transmission direction ("uplink") directed in an opposite direction from the mobile-radio device 2 to the base station 1. In this context, not only the actual payload data are transmitted across the radio connection between the base-station 1 and the mobile-radio device 2, but also information regarding the quality of the connection, the transmission power to be set and the correct or incorrect reception of data. Accordingly, for example, with the use of a packet-wise transmission of payload data, a check value is transmitted together with the data. The receiving device, that is, either the base station 1 or the mobile-radio device 2, can determine on the basis of this check value, whether the data received have been correctly transmitted. If the data have been correctly transmitted, a positive acknowledgement signal ("ACK") is returned. However, if the transmission and/or the evaluation was incorrect, a negative acknowledgement signal ("NACK") is returned. As a consequence of a negative acknowledgement signal, it is then possible, dependent upon the communications standard used, to transmit the incorrectly transmitted data packet once again, for example, in a redundant form. By contrast, if the transmission and evaluation was successful, an "ACK" acknowledgement signal is returned. In consequence, new payload data can be transmitted in the subsequent data packet.

In a similar manner, it can be determined by the receiving device, whether the transmission power of the communicating partner is sufficiently high. For example, if the transmission power is insufficient to allow a reliable transmission of data because of increasing distance or the attenuation properties of the radio path, it is indicated in the returned response signal, that the power must be increased, for example, by one power increment.

As already indicated in the introduction, so-called protocol testers can be used to measure the behavior of a device for a mobile-radio system. Protocol testers set up a radio connection with the device under test with uplink and downlink corresponding to the standard. However, the generation of signals to be transmitted, which correspond to a mobile-radio standard, is also possible with a signal generator, which does not provide a reception device for the reception of the response signal transmitted in a standardized manner via the return channel of the device. According to the invention, as will be explained in greater detail below with reference to FIG. 2, the response signal of the device under test transmitted in the return channel is not evaluated by a standardized reception device, but an envelope characteristic for the information to be communicated is sampled.

Figure 2:
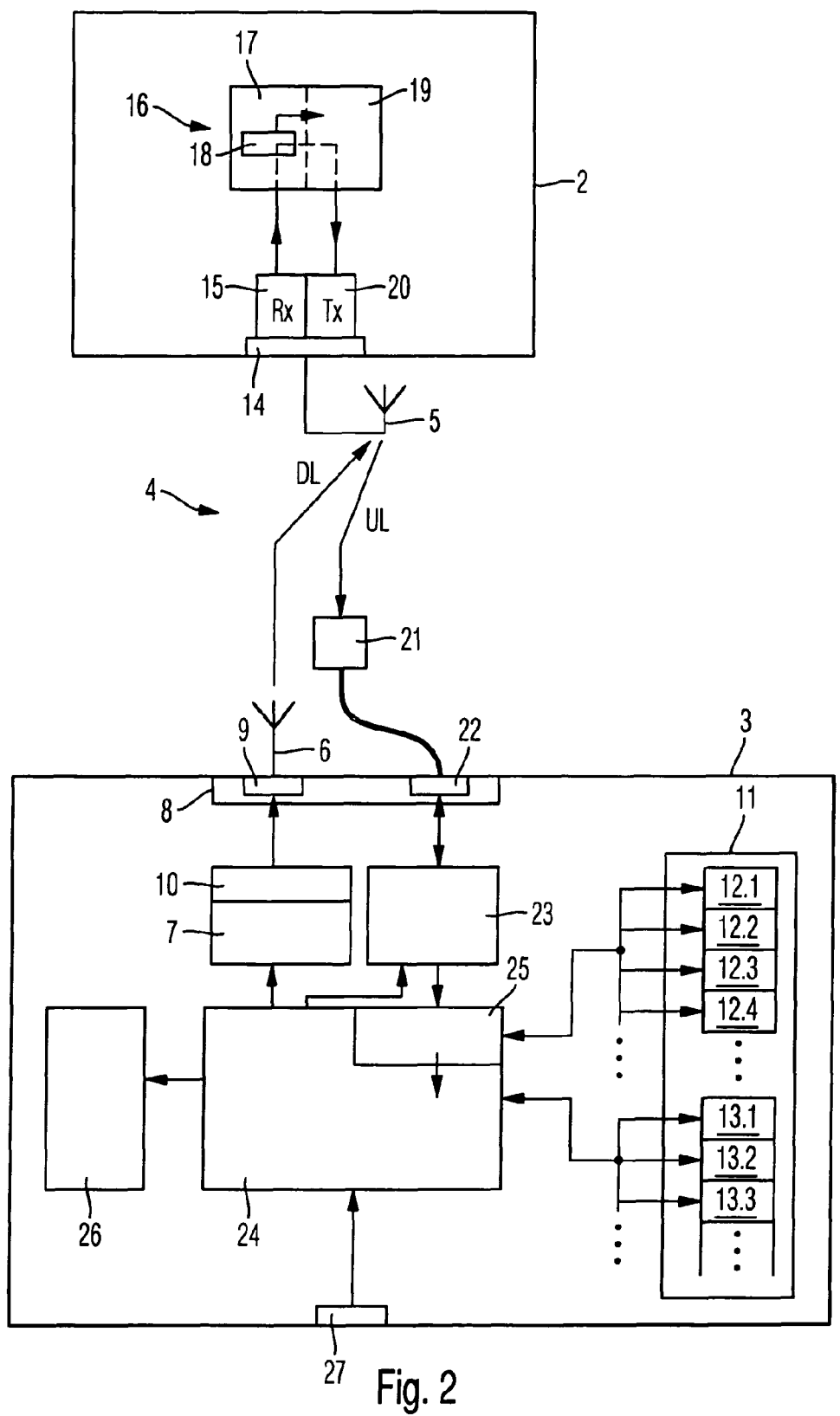
FIG. 2 shows a block-circuit diagram of a test system according to the invention explaining the method according to the invention and the signal generator and the device for a mobile-radio system according to the invention.

In addition to the device under test, which is the mobile-radio device 2 merely by way of example, the measuring system according to the present invention illustrated in FIG. 2 comprises a signal generator 3. The signal generator 3 and the mobile-radio device 2 communicate with one another via a radio connection 4. For this purpose, the mobile-radio device 2 provides a first antenna 5. Correspondingly, the signal generator 3 provides a second antenna 6. A signal generated by the signal generator 3 is transmitted via the second antenna 6 and received by the first antenna 5 of the mobile radio device 2.

In order to generate the signal, the signal generator 3 provides a signal-generating portion 7, in which signal data are generated or called up. A signal is generated from the signal data and supplied to a transmission portion 10, which is connected to an input/output group 8. The input/output group 8 provides an output connection 9, which is connected to the second antenna 6.

The signal-generating portion 7 is set up in such a manner that signal data can be generated directly through the signal-generating portion 7. Alternatively, the signal-generating portion 7 can call up a data record with signal data from a buffer 11. For example, several redundant data records are buffered in the buffer 11. If, in response to a transmitted signal, a negative acknowledgement signal ("NACK") is detected, that is to say, the information that the previously transmitted data were not received and evaluated correctly by the mobile-radio device 2, a redundant data record can be called up accordingly by the signal-generating portion 7 and transmitted to the mobile-radio device 2 in a subsequent signal.

The mobile-radio device 2 provides an antenna connection 14, which is connected to the first antenna 5. The signal received is re-routed by a reception module 15 to the signal-processing unit 16. The signal-processing unit 16 provides an evaluation unit 17. The received signal is evaluated and demodulated in the evaluation unit 17 and, for example, the agreement between a checksum and the data determined from the received signal is checked. Dependent upon the result of this evaluation, a result is generated by a response-signal-generating portion 19 of the signal-processing unit 16. This response signal is supplied via a transmission module 20 to the first antenna 5 and transmitted.

By way of further explanation, it can initially be assumed that the response signal, which is generated in the response-signal-generating portion 19 in response to the evaluation of the received signal, provides a non-constant envelope and an information regarding the correct reception of the signal transmitted by the signal generator 3 is contained in the response signal. This is the case, for example, if the mobile-radio standard, according to which the device under test is communicating, prescribes a response signal with a characteristic envelope of this kind. For this purpose, as already explained, acknowledgement signals are used. A positive acknowledgement signal is referred to as "ACK", and a negative acknowledgement signal is referred to as "NACK" and differs in a characteristic manner with regard to the envelope of the response signal transmitted. On the basis of the characteristic envelope of the response signal, a power measurement can be implemented in order to distinguish between the acknowledgement signals. Accordingly, the relevant content of the response signal can be determined by a power measurement and, for example, without the need for the signal generator to implement a demodulation of the response signal.

The presentation on the basis of a so-called HARQ process ("hybrid automatic repeat request") has been selected merely by way of example. Similarly, other information can be contained in the response signal. A power setting of the transmission power of the respectively connected device is named as a further example.

Since the signal generator does not provide a reception device, which permits a standardized analysis and processing of the response signal, the response signal transmitted from the mobile-radio device 2 is evaluated with regard to its characteristic envelope. A measuring device 21 is provided for the sampling of the envelope. The measuring device 21 is a power test probe, which is connected to the input connection 22 of the input/output unit 8 of the signal generator. A test signal, which is representative for the measured envelope is generated by the measuring device 21. This test signal is supplied via the input connection 22 to the signal generator 3 and read out by the read-out unit 23. Since the response signals are disposed in a given time relationship with the originally transmitted signal containing a data packet, the read-out of the input connection 22 is time controlled. The time control takes place by means of a control portion 24, which controls the transmission portion for the transmission of the signal and the read-out unit 23 in a time-corrected manner. A time-corrected control is understood to mean the observation of a time offset between the transmission of a data packet and the arrival of a response corresponding to it. Accordingly, a triggered measurement of the envelope of the response signal can be implemented by the measuring device 21, which allows the assignment of the information obtained from the response signal to a given transmitted signal or respectively to the data packet underlying the signal.

The read-out unit 23 is connected to a correlator 25 of the control portion 24. The characteristic of the test signal is supplied by the read-out unit 23 to the correlator 25. Furthermore, the correlator 25 is connected to the buffer 11. Several comparison signals 12.1 ... 12.4 are buffered in the buffer 11. The correlator 25 now investigates the waveform of the test signal with regard to an agreement with one of the comparison signals 12.i. The comparison signals 12.i correspond to the possible waveforms for the power of a response signal. Accordingly, the information of the response signal to be communicated can be implemented by a comparison of the measured waveform of the envelope with the comparison signals 12.i, which are buffered in the buffer 11. The result of the comparison is communicated by the correlator 25 to the control portion 24. In the case of an agreement with one of the comparison signals 12.i, the control portion 24 determines an assigned change command 13.i, which is also stored in the buffer. In the previously described example, in which a HARQ process or a sequence of successive HARQ processes is checked, only two different comparison signals 12.1 and 12.2 are buffered in the buffer 11. Accordingly, two change commands 13.1 and 13.2 are also stored in the buffer 11. The presentation of further comparison signals 12.i and further change commands 13.i is merely intended to illustrate that other information can also be determined from a characteristic power waveform of the response signal by means of the measuring device 21.

If the data have been correctly received, and accordingly, if a positive acknowledgement signal "ACK" is communicated in the response signal, for example, an agreement with the first comparison signal 12.1 is determined by the correlator 25. The change command 13.1 assigned to the first comparison signal 12.1 is read in by the control portion 24. In the case of a positive acknowledgement signal "ACK", the change command 13.1 indicates that new signal data can be transmitted in a signal to the mobile-radio device 2. The control portion 24 accordingly controls the signal-generating portion 7 in such a manner that new signal data are generated for communication to the mobile-radio device 2 or read in from the buffer 11.

By contrast, if the response signal contains a negative acknowledgement signal "NACK", an agreement with the second comparison signal 12.2 is determined by the correlator 25. The subsequent assignment of the second change command 13.2 means that the control portion 24 controls the signal-generating portion 7 in such a manner that the same payload data, for example, in a redundant form, are transmitted to the mobile-radio device 2. The change command can also provide more complex changes for several successive agreements of measured power waveforms with a given comparison signal. For example, in the case of several successive agreements with negative acknowledgement signals "NACK", another redundancy version can be transmitted in each case ("incremental redundancy").

With the test cycle described, an error rate is determined through successive transmission of payload data and determination of a proportion of signals received in an erroneous manner. For this purpose, the proportion of "ACK" and "NACK" acknowledgement signals is evaluated.

It is clearly evident that, in the case of the information regarding a power setting in the response signal, the transmission portion 10 is controlled by the control portion 24. The agreements between the measured test signal and the respective comparison signal 12.i determined by the correlator 25 are communicated by the control portion 24 to an analysis portion 26. There, for example, the number of "ACK" or "NACK" signals contained in the response signal can be evaluated and accordingly a block-error rate can be determined.

The preceding deliberations assume that the response signal in each case provides an envelope characteristic for the information to be communicated. In principle, the method and the corresponding signal generator 3 can however, also be used with mobile-radio standards, wherein a constant envelope of the response signal is provided or where the envelopes differ from one another so little that they cannot be regarded as characteristic for the information to be transmitted. The operation of the device under test is then implemented in a test mode, which generates an alternative response signal instead of the standardized response signal, of which the envelope is once again characteristic for the information to be communicated.

The device under test, that is to say, in the illustrated example, the mobile radio device 2, provides a signal interpreter 18, which is provided in the signal-processing unit 16. The start of the test cycle is recognized by this signal interpreter 18 from a first signal transmitted at the start of the test cycle. The response-signal-generating portion 19 is set up in this context in such a manner that it can generate in a standardized manner a response signal with a constant envelope and also, deviating from the standard, a response signal envelope, which is, however, characteristic for the information to be transmitted. It is possible to switch between these two modes dependent upon the result of the signal interpreter 18.

Accordingly, if a signal transmitted by the signal generator 3 is recognized as the start of a test cycle, the response-signal-generating portion 19 is switched into its test mode, in which, deviating from the response signal prescribed in the standard, it generates a non-constant characteristic envelope of the response signal. In order to return the response-signal-generating portion 19 into its normal operating mode, a given signal distinguishable by the signal interpreter 18 from the signal for the implementation of the actual measurement is preferably also generated. Provided the signal interpreter 18 does not determine a signal of this kind indicating a test cycle, a standardized response signal is, by contrast, generated by the response-signal-generating portion, and a communication of the mobile-radio device 2 in the regular operating mode is possible. The signal starting the test cycle and the signal terminating the test cycle differ in this context from the signals transmitted during the actual measurement and are therefore identifiable by the signal interpreter 18.

For instance, different comparison signals 12.$i$ or respectively change commands 13.$i$ can be buffered in the buffer 11 via a general port 27 of the signal generator 2. Alternatively, however, it is also possible to generate the comparison signals 12.$i$ and buffer them in the buffer 11 at the start of the test cycle via the measuring device 21. For this purpose, a signal starting the test cycle is transmitted to the mobile radio device 2. The evaluation unit 16 of the mobile-radio device 2 is then set up in such a manner that the start of the test cycle is recognized by the signal interpreter 18. The response-signal-generating portion 19 accordingly initially generates a response signal with a characteristic envelope corresponding to a possible first response signal, which is converted by the measuring device 21 into a test signal. This test signal is then read-in by the read-out unit 23 and buffered in the buffer 11 as a first comparison signal 12.1. Following this, for example, a possible second response signal with an envelope differing from the latter is then generated by the response-signal-generating portion 19 and stored as a second comparison signal 12.2 in the buffer 11. The generation of a sequence of this kind of response signals as a sequence of a term-response signals, in this context, can be generated either through a single start instruction in the form of a signal transmitted from the signal generator 3 recognisable by the signal interpreter 18, or respectively triggered by different signals distinguishable by the signal interpreter 18. In the latter case, the control option of the procedure would be significantly improved, however, an increased functionality of the signal interpreter 18 is then required.

Figure 3:
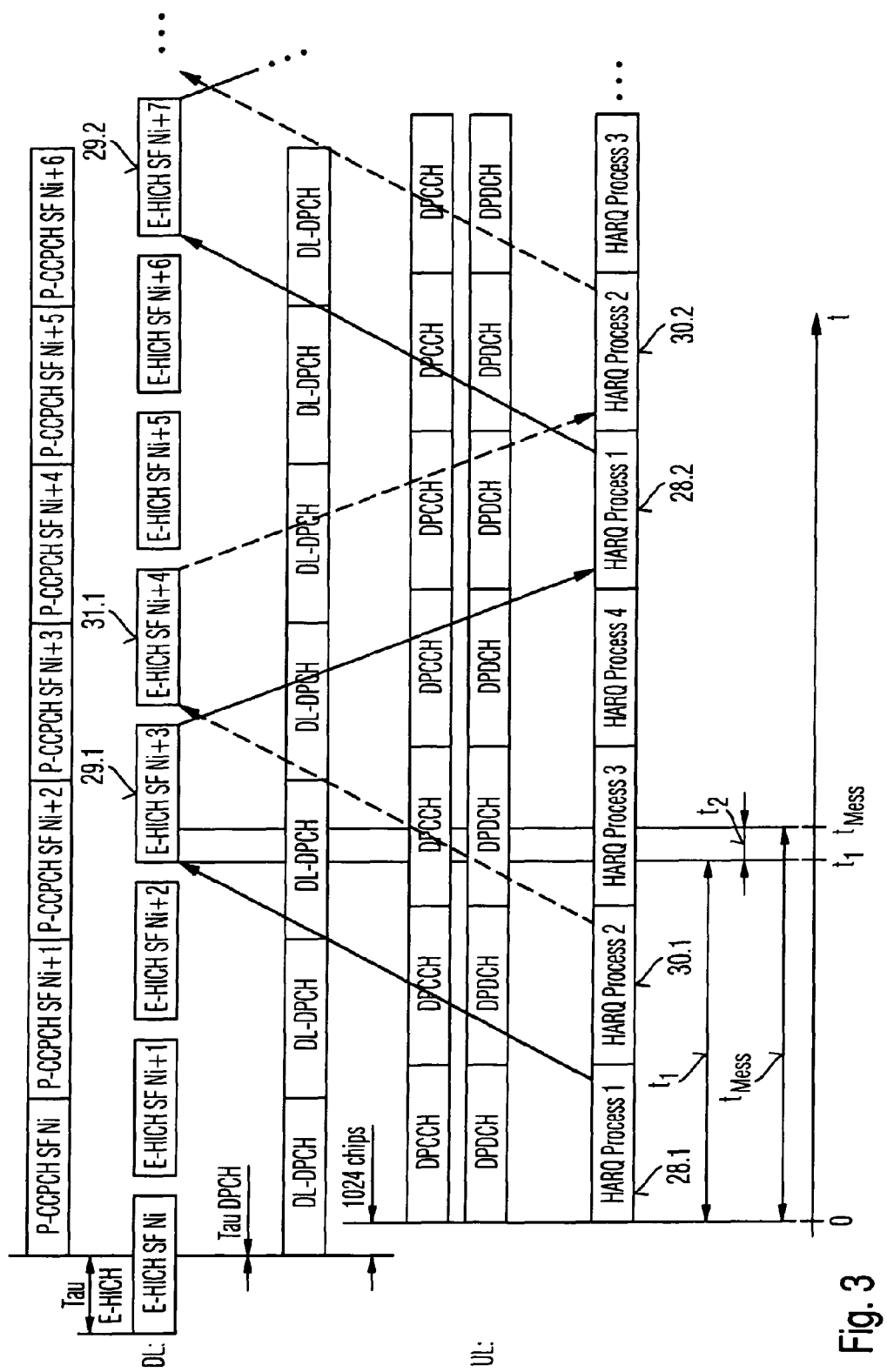
FIG. 3 shows a schematic presentation for the time sequence of the data transmission between a signal generator and the device under test for a mobile-radio system.

In FIG. 3, the time procedure of the so-called HARQ processes is presented once again by way of further explanation. The reference number 28.1 in this context refers to a first high-frequency signal portion of a first HARQ process. This first high-frequency signal portion is based upon the first data record, which is communicated in the uplink, for example, to a base station 1 under test. In order to elucidate that the method according to the invention can be used not only for testing mobile-radio devices 2, but also for testing base stations 1, the example now relates, by contrast with FIG. 2, to the communication of data to a base station 1. The base station 1 provides at least the same components as have been explained already with reference to the mobile-radio device 2. Accordingly, the received, first high-frequency signal portion 28.1 is evaluated and a response signal is returned. This response signal is illustrated as a downlink signal portion 29.1. The time offset $t_1$ between the high-frequency signal portion 28.1 and the response signal 29.1 corresponding to it as specified by the mobile-radio standard is taken into consideration by the control portion 24 through the time control of the read-out unit 23. Furthermore, an adjustable delay $t_2$ is preferably used in order to control the actual read-out time in the implementation of the measurement. In this manner, the sum of the times $t_1+t_2$ of the time difference $t_{Mess}$ with which the power of the response signal 29.1 is measured, can be adjusted.

In the exemplary embodiment presented, four concurrent HARQ processes are provided. Following the first high-frequency signal portion 28.1, a second high-frequency signal portion 30.1 is transmitted to the base station 2 in the uplink. After the transmission of two further high-frequency signal portions, corresponding to the change commands, which were determined after the evaluation of the response signal 29.1, upon the recognition of a negative acknowledgement signal "NACK", either an identical data record or a redundant data record is transmitted by the signal generator 3 in the further high-frequency signal portion 28.2 associated with the first HARQ process. If a positive acknowledgement signal "ACK" is returned, a new data record is transmitted.

Figure 4:
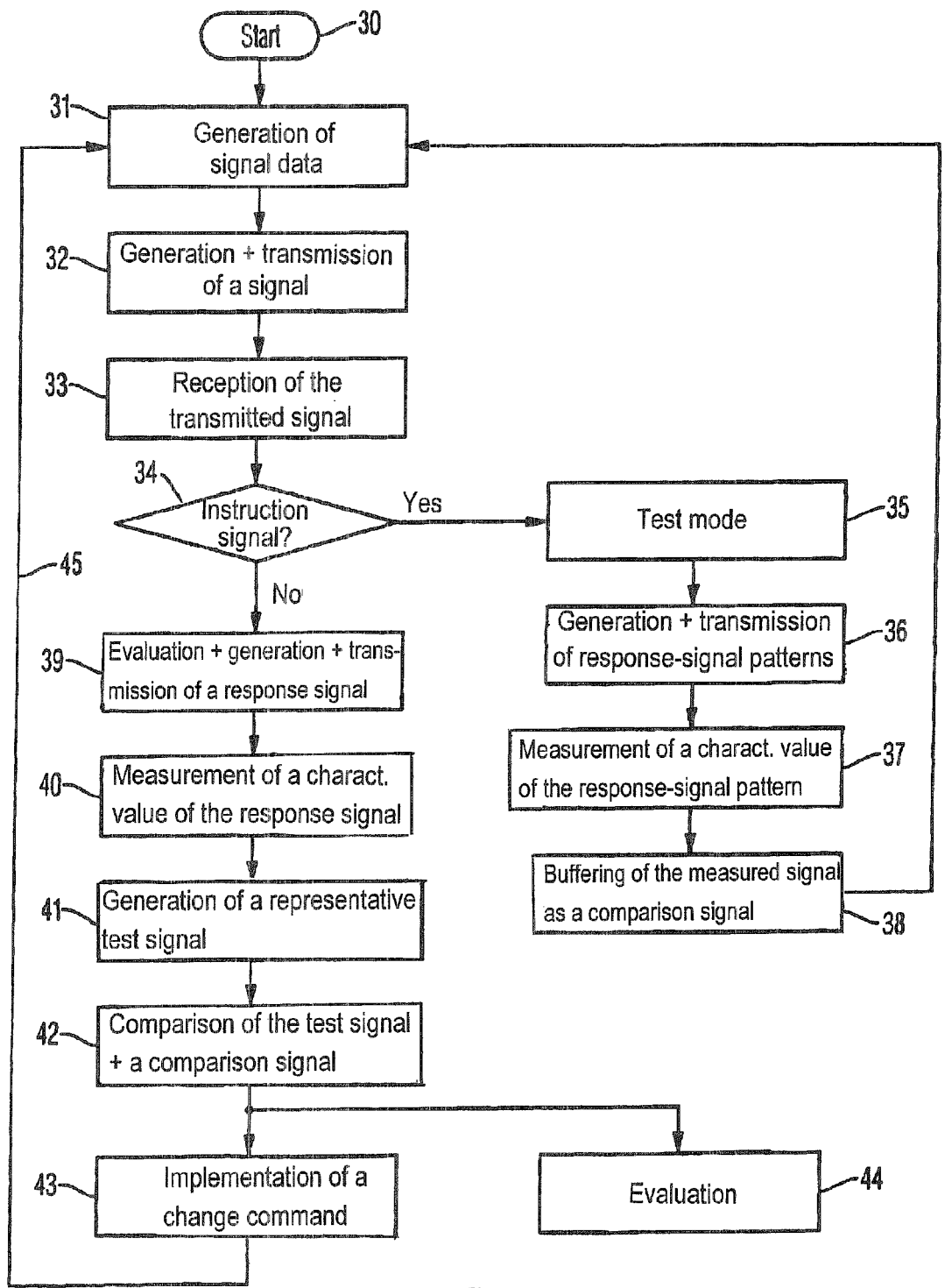
FIG. 4 shows a diagram explaining the implementation of the method according to the invention.

The procedure of the method according to the invention with a measuring system consisting of a device under test and the signal generator 3 is once again presented schematically in FIG. 4. Initially, the measurement is started (30). Following this, signal data are generated by the signal generator 3 (31). The signal data contain, for example, a start instruction, which is recognized by the signal interpreter 18, for the implementation of the actual test cycle. From the signal data, which are generated either in the signal-generating portion 7 or read out by it from the buffer 11, a signal is generated and then transmitted via the second antenna 6 (32).

The signal is received by the device under test, that is to say, in the example presented by the mobile-radio device 2 (33). With every received signal, the signal interpreter 18 initially analyzes whether an instruction signal is present (34). Upon the recognition of a "Start" instruction signal by the signal interpreter 18, the signal-processing unit 16 is switched into the test mode. In the test mode, a signal with an envelope characteristic of the information contained therein is generated by the response-signal-generating portion 19 as a response signal (35). After the switch over into the test mode, one or more response-signal patterns are initially generated by the response-signal-generating portion 19 and transmitted via the first antenna 5 in succession (36). The time sequence is specified by the time span $t_1$ determined by the mobile-radio connection to be measured according to the standard. Triggered in this manner, the possible response signals can be converted into comparison signals and buffered.

The response signal transmitted from the first antenna 5 or respectively the mobile radio device 2 is measured by the measuring device 21 and the determined test signal is supplied to the signal generator 3 (37). The test signals, which correspond to the response-signal patterns, are stored within the signal generator 3 in the buffer 11 (38). After the buffering of the test signals corresponding to the response-signal patterns as comparison signals 12.$i$ in the buffer 11, the signal data used for the actual measurement are generated in the signal-generating portion 16 step 31. However, these signal data are now the signal data used for the actual measurement, for example, pre-defined payload data. Accordingly, after the reception of the signal transmitted by the signal generator 3, no instruction is recognized, and the received signal is evaluated by the evaluation unit 17 of the mobile-radio device 2. Dependent upon a correct or incorrect evaluation, a corresponding response signal ("ACK" or "NACK") is generated and returned as a response signal. Since the signal-processing unit 16 has previously been switched into the test mode, for a positive acknowledgement signal "ACK", a response signal is generated, of which the envelope differs in a characteristic manner from an envelope of a response signal generated for a negative acknowledgement signal "NACK". The characteristic value in the form of the envelope of the response signal is sampled by the measuring device 21 and a corresponding test signal is determined. The test signal is supplied to the input connection 22 of the signal generator 3 (40, 41).

The test signal obtained is checked for agreement with the comparison signals 12.$i$ by means of the correlator 25 (42). If an agreement is found between a comparison signal and the test signal, the change command 13.$i$ assigned to the comparison signal 12.$i$ is then determined and implemented by the control portion 24 through a corresponding control of the signal-generating portion or respectively of the transmission portion 7, 10. The agreements determined are additionally communicated to the analysis portion 26. In the analysis portion 26, an evaluation 44 of the returned response signals is implemented.

In a measurement after the implementation of the change command (43), a signal is again transmitted to the mobile-radio device 2 and its response is determined. The multiple run-through of the corresponding method steps is indicated in FIG. 4 by the arrow 45. A test loop can comprise, for example, a fixed number of runs through the steps 31-34 and 39-44.

The invention is not restricted to the exemplary embodiment presented. In particular, individual functions and individual method steps of the exemplary embodiment can be advantageously combined with one another. In this context, instead of the simple checking of the correct evaluation selected for the example and the return of positive and negative acknowledgement signals, it is also possible to generate other response signals distinguishable through a characteristic envelope.

The invention claimed is:

1. A method for testing devices of mobile-radio systems with the following method steps:
generating signal data,
generating a signal from the signal data by a signal generator,
transmitting the signal to a device under test,
receiving the signal by the device under test,
evaluating the received signal and generating based on the evaluated received signal a response signal and transmitting the response signal, wherein the response signal provides a characteristic waveform of an envelope for information to be returned in the response signal,
measuring the characteristic envelope and generating a test signal representing the waveform of the envelope in a measuring device,
processing the test signal by the signal generator without a protocol tester, without a standardized demodulation of the response signal for retrieving the information,
comparing the test signal representing the waveform of the envelope with at least one comparison signal by the signal generator to retrieve the information, and
wherein in the event of an agreement of the test signal with the at least one comparison signal,
assigning the test signal to a change command corresponding to the at least one comparison signal,
reading in the change command, and
generating sequence signals to be transmitted to the device under test and/or transmitting generated sequence signals to the device under test dependent upon an evaluation of the change command corresponding to the at least one comparison signal.

2. The method according to claim 1,
wherein the at least one comparison signal is buffered in a buffer of the signal generator.

3. The method according to claim 2,
wherein in each case a response signal corresponding to a comparison signal is generated by the device under test, and the representing test signal generated from the response signal by measuring the power waveform is buffered as a comparison signal.

4. The method according to claim 1,
wherein, in order to generate the test signal, a measuring device connected to the signal generator is read out in a time controlled manner by the signal generator.

5. The method according to claim 1,
wherein, in order to compare the test signal with the at least one comparison signal, a pattern recognition is performed.

6. The method according to claim 1,
wherein, in order to start a measurement, a given signal initiating the test cycle is transmitted to the device under test.

7. The method according to claim 1,
wherein the device under test generates within a test cycle a non-standardized response signal with a characteristic envelope, if a mobile-radio standard used for the transmission of signals from the signal generator to the device under test provides a response signal with a constant envelope or an envelope not characteristic for the information to be returned.

8. A signal generator with a signal-generating portion for generating a signal, a transmission portion for transmitting the signal and a control portion for controlling the signal-generating portion and/or the transmission portion,
wherein the signal generator further comprises
a measuring device configured to measure an envelope of a response signal to the signal, wherein the response signal provides a characteristic waveform of an envelope for information to be returned in the response signal, and to generate a test signal representative of the measured envelope without a protocol tester for retrieving the information,
a correlator, wherein at least one comparison signal and the test signal can be supplied to the correlator for comparison of the test signal representing a waveform of the envelope with the at least one comparison signal,
a buffer storing a change command corresponding to the at least one comparison signal,
wherein the signal generator is configured to process the test signal without a standardized demodulation of the response signal for retrieving the information, and wherein in the event of an agreement of the test signal with the at least one comparison signal, to assign the test signal to a change command corresponding to the at least one comparison signal, to read in the change command, and to generate sequence signals to be transmitted to the device under test and/or transmit generated sequence signals to the device under test dependent upon an evaluation of the change command corresponding to the at least one comparison signal.

9. The signal generator according to claim 8,
wherein the at least one comparison signal and a change command assigned to the at least one comparison signal are buffered in a buffer of the signal generator, and the control portion is set up in such a manner that, in the event of an agreement of the test signal with the at least one comparison signal, the signal-generating portion and/or the transmission portion is controlled according to the change command.

10. The signal generator according to claim 8,
wherein a test signal supplied to an input connection of the signal generator can be buffered as the at least one comparison signal.

11. The signal generator according to claim 9,
wherein a test signal supplied to the input connection can be read in by the control portion in a time controlled manner.

12. The signal generator according to claim 8,
wherein at least one first signal and a second signal differing from it can be generated by the signal-generating portion.

13. A measuring system for testing devices for mobile-radio systems comprising:
a signal generator with a signal generating portion for generating a signal, a transmission portion for transmitting the signal,
a device under test with a response-signal-generating portion for generating a response signal based on evaluating the received signal, wherein the response signal provides a characteristic waveform of an envelope for information to be returned in the response signal, and a measuring device for generating a test signal representative of the characteristic waveform of the envelope from the response signal by measuring of the characteristic envelope for retrieving the information, wherein the signal generator is configured to process the test signal without a standardized demodulation of the response signal and without a protocol tester for retrieving the information, and comprises a correlator for comparing the test signal representing the waveform of the envelope with at least one comparison signal to retrieve the information, and wherein in the event of an agreement of the test signal with the at least one comparison signal, the signal generator is configured to assign the test signal to a change command corresponding to the at least one comparison signal, to read in the change command, and to generate sequence signals to be transmitted to the device under test and/or transmit generated sequence signals to the device under test dependent upon an evaluation of the change command corresponding to the at least one comparison signal.

14. The system according to claim 13,
wherein the at least one comparison signal is buffered in a buffer of the signal generator.

15. The system according to claim 14,
wherein in each case a response signal corresponding to the at least one comparison signal is generated by the device under test, and the representing test signal by measuring the power waveform is buffered as the at least one comparison signal.

16. The system according to claim 13,
wherein in order to generate the test signal, the measuring device is read out in a time controlled manner by the signal generator.

* * * * *